UNITED STATES PATENT OFFICE.

ABSALOM D. BREAZEALE, OF SELMA, ALABAMA.

IMPROVEMENT IN MEDICAL COMPOUNDS OR MOSQUITO LOTIONS.

Specification forming part of Letters Patent No. 131,655, dated September 24, 1872.

*To all whom it may concern:*

Be it known that I, ABSALOM D. BREAZEALE, of the city of Selma, in the county of Dallas and State of Alabama, have invented a certain new and useful compound, which I denominate "Breazeale's Mosquito Lotion," of which the following is a description:

The compound is used as a remedy for the bites of mosquitoes, fleas, bedbugs, ants, sand-flies, ear-flies, buffalo and black gnats, and all other poisonous insects; while its use as a cosmetic for removing blotches, freckles, and sun-tan from the skin has practically shown it to be possessed of great merit and virtue.

The said compound is composed of the oils of pennyroyal, savine, origanum, terebinth, and sassafras; tinctures of lavender, chloroform, and arnica; gum-camphor, niter, alcohol, and rectified oil of petroleum; and the several ingredients are compounded in the following proportionate quantities and in the order herein below stated: Oil of pennyroyal, oil of savine, oil of origanum, oil of terebinth, oil of sassafras, of each one fluid dram; tincture of lavender and chloroform, of each one fluid dram; pulverized gum-camphor and pulverized niter, of each one dram; tincture of arnica and alcohol, (95°,) of each one fluid ounce; and rectified oil of petroleum, seven fluid drams. Mix by first adding the camphor and niter to the alcohol, then add the other ingredients, shaking well as each is added, and when completed four fluid ounces of the lotion is produced.

Having described my invention, I claim—

The compound herein described, made from the ingredients in, or in about, the proportions named, for the purposes stated.

In testimony whereof I have hereunto signed my name.

ABSALOM D. BREAZEALE.

Witnesses:
WM. C. WARD,
JOS. T. JOHNSTON.